United States Patent
Nagaoka et al.

(10) Patent No.: US 12,251,683 B2
(45) Date of Patent: *Mar. 18, 2025

(54) TRANSITION METAL INCORPORATED ALUMINA FOR IMPROVED THREE WAY CATALYSTS

(71) Applicant: Johnson Matthey Public Limited Company, London (GB)

(72) Inventors: Shuhei Nagaoka, Tochigi (JP); Xiaorui Zhang, Tochigi (JP)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,322

(22) Filed: Dec. 12, 2023

(65) Prior Publication Data

US 2024/0109055 A1    Apr. 4, 2024

Related U.S. Application Data

(63) Continuation of application No. 17/822,549, filed on Aug. 26, 2022, now Pat. No. 11,986,802.

(Continued)

(51) Int. Cl.
  *B01J 21/04*    (2006.01)
  *B01D 53/94*    (2006.01)
  (Continued)

(52) U.S. Cl.
  CPC ............ *B01J 23/58* (2013.01); *B01D 53/945* (2013.01); *B01J 21/04* (2013.01); *F01N 3/101* (2013.01);
  (Continued)

(58) Field of Classification Search
  CPC ... B01J 21/04; B01J 23/02; B01J 23/04; B01J 23/10; B01J 23/20; B01J 23/28;
  (Continued)

(56) References Cited

U.S. PATENT DOCUMENTS

| 4,992,405 A | 2/1991 | Chattha |
| 5,021,389 A | 6/1991 | Chattha |

(Continued)

FOREIGN PATENT DOCUMENTS

| CN | 104174412 B | 12/2014 |
| CN | 108393086 A | 8/2018 |

(Continued)

OTHER PUBLICATIONS

U.S. Appl. No. 17/822,549, filed Aug. 26, 2022.

(Continued)

*Primary Examiner* — Cam N. Nguyen
(74) *Attorney, Agent, or Firm* — Ni Yan

(57) ABSTRACT

A three-way catalyst article, and its use in an exhaust system for internal combustion engines, is disclosed. The catalyst article for treating exhaust gas comprising: a substrate comprising an inlet end and an outlet end with an axial length L; and a first catalytic region on the substrate; wherein the first catalytic region comprises a first PGM component and a first alumina, wherein the first alumina is doped with a first dopant of at least 5 wt. %, and wherein the first dopant is selected from the group consisting of Zr, Ta, Mo, W, Ti, Nb, and a combination thereof.

17 Claims, 1 Drawing Sheet

Related U.S. Application Data

(60) Provisional application No. 63/267,355, filed on Jan. 31, 2022, provisional application No. 63/260,745, filed on Aug. 31, 2021.

(51) Int. Cl.

| | | |
|---|---|---|
| *B01J 23/02* | (2006.01) | |
| *B01J 23/04* | (2006.01) | |
| *B01J 23/10* | (2006.01) | |
| *B01J 23/20* | (2006.01) | |
| *B01J 23/28* | (2006.01) | |
| *B01J 23/30* | (2006.01) | |
| *B01J 23/42* | (2006.01) | |
| *B01J 23/44* | (2006.01) | |
| *B01J 23/46* | (2006.01) | |
| *B01J 23/58* | (2006.01) | |
| *B01J 23/63* | (2006.01) | |
| *B01J 23/648* | (2006.01) | |
| *B01J 23/652* | (2006.01) | |
| *B01J 35/56* | (2024.01) | |
| *F01N 3/10* | (2006.01) | |

(52) U.S. Cl.
 CPC ............... *B01D 2255/9032* (2013.01); *B01D 2255/908* (2013.01); *B01D 2257/40* (2013.01); *B01D 2257/502* (2013.01); *B01D 2257/702* (2013.01)

(58) Field of Classification Search
 CPC ... B01J 23/30; B01J 23/42; B01J 23/44; B01J 23/464; B01J 23/58; B01J 23/63; B01J 23/6484; B01J 23/6486; B01J 23/6525; B01J 23/6527; B01J 35/56; B01J 53/945; F01N 3/101
 USPC ........ 502/302–304, 327–329, 332–334, 339, 502/355, 415, 439
 See application file for complete search history.

(56) References Cited

U.S. PATENT DOCUMENTS

| | | | |
|---|---|---|---|
| 5,597,771 A | 1/1997 | Hu et al. | |
| 5,922,294 A | 7/1999 | Chattha | |
| 5,948,723 A | 9/1999 | Sung | |
| 7,875,250 B2 | 1/2011 | Nunan | |
| 8,673,809 B2 | 3/2014 | Nakatsuji | |
| 8,679,411 B2 | 3/2014 | Akamine | |
| 8,828,343 B2 | 9/2014 | Liu | |
| 8,950,174 B2 | 2/2015 | Hilgendorff | |
| 9,242,242 B2 | 1/2016 | Hilgendorff | |
| 9,283,547 B2 | 3/2016 | Alive | |
| 9,511,358 B2 | 12/2016 | Nazarpoor | |
| 9,604,175 B2 | 3/2017 | Hatfield | |
| 9,610,564 B2 | 4/2017 | Xue | |
| 9,643,161 B2 | 5/2017 | Chiffey | |
| 9,662,638 B2 | 5/2017 | Hoyer | |
| 9,707,542 B2 * | 7/2017 | Bergeal | ............... B01J 29/7007 |
| 9,744,529 B2 | 8/2017 | Xue | |
| 9,914,095 B1 | 3/2018 | Getsoian | |
| 9,981,258 B2 | 5/2018 | Xue | |
| 9,987,618 B2 | 6/2018 | Chiffey | |
| 10,183,253 B2 | 1/2019 | Onoe | |
| 10,201,805 B2 | 2/2019 | Ohashi | |
| 10,247,071 B2 | 4/2019 | Wang | |
| 10,357,744 B2 | 7/2019 | Ohashi | |
| 10,626,765 B2 | 4/2020 | Inoda | |
| 10,875,010 B2 * | 12/2020 | Nagaoka | ............... B01J 37/0209 |
| 11,141,697 B2 | 10/2021 | Chen | |
| 11,167,273 B2 | 11/2021 | Zheng | |
| 11,253,840 B2 | 2/2022 | Kobayashi | |
| 11,364,489 B2 | 6/2022 | Makino | |
| 11,534,736 B2 | 12/2022 | Wei | |
| 11,642,658 B2 * | 5/2023 | Kitamoto | ................. B01J 35/40 |
| | | | 502/339 |
| 11,794,170 B2 * | 10/2023 | Jing | ......................... B01J 21/04 |
| 11,872,542 B2 * | 1/2024 | Tang | ..................... F01N 3/2066 |
| 11,904,299 B2 * | 2/2024 | Zheng | ................ B01D 53/9468 |
| 11,982,218 B2 * | 5/2024 | Sung | ........................ B01J 23/42 |
| 2013/0267411 A1 | 10/2013 | Woodfield | |
| 2015/0352494 A1 | 12/2015 | Hatfield | |
| 2016/0184804 A1 | 6/2016 | Nagao | |
| 2017/0297004 A1 | 10/2017 | Hoshino | |
| 2019/0022584 A1 | 1/2019 | Hilgendorff | |
| 2019/0105636 A1 | 4/2019 | Wang | |
| 2020/0030776 A1 | 1/2020 | Jing | |
| 2020/0188887 A1 | 6/2020 | Kobayashi | |
| 2020/0347763 A1 | 11/2020 | Liu | |
| 2021/0270165 A1 | 9/2021 | Sasaki | |
| 2021/0283580 A1 | 9/2021 | Zheng | |
| 2021/0301698 A1 | 9/2021 | Armitage | |
| 2022/0025796 A1 | 1/2022 | Vjunov | |
| 2022/0055021 A1 * | 2/2022 | Liu | ...................... F01N 3/2803 |
| 2022/0072515 A1 | 3/2022 | Jing | |
| 2022/0088575 A1 * | 3/2022 | Hayashi | ................. B01J 37/038 |
| 2022/0203339 A1 | 6/2022 | Zheng | |
| 2022/0212170 A1 | 7/2022 | Sung | |
| 2023/0070493 A1 | 3/2023 | Millington | |
| 2023/0372905 A1 | 11/2023 | Kazi | |
| 2024/0269613 A1 * | 8/2024 | Nagaoka | ............... F01N 3/2803 |

FOREIGN PATENT DOCUMENTS

| | | | |
|---|---|---|---|
| CN | 108940280 A | 12/2018 | |
| EP | 1095702 A1 | 5/2001 | |
| WO | 2010129490 A2 | 4/2011 | |
| WO | 2012029050 A1 | 3/2012 | |
| WO | 2015101766 A1 | 7/2015 | |
| WO | 2016124943 A1 | 8/2016 | |
| WO | 2016143722 A1 | 9/2016 | |
| WO | 2017037006 A1 | 3/2017 | |
| WO | 2019065659 A1 | 4/2019 | |
| WO | 2019075154 A1 | 4/2019 | |
| WO | 2019086968 A1 | 5/2019 | |
| WO | 2019239325 A1 | 12/2019 | |
| WO | 2020046266 A1 | 3/2020 | |
| WO | WO-2021140326 A1 * | 7/2021 | ........... B01D 53/945 |
| WO | WO-2021165697 A1 * | 8/2021 | ........... B01D 53/945 |

OTHER PUBLICATIONS

F.M.T. Mendes et al.: Ammonium complex of niobium as a precursor for the preparation of Nb2O5/Al2O3 catalysts. Catalysis Today 78 (2003) 449-458.

Gestoian et al—"Sensitivity of Three-Way Catalyst Light-Off Temperature to Air-Fuel Ratio" Emission Control Science and Technology 4, 136-142 (2018).

Getsoian et al—Remarkable improvement in low temperature performance of model three-way catalysts through solution atomic layer deposition, Nature Catalysis 2, 614-622 (2019).

* cited by examiner

TRANSITION METAL INCORPORATED ALUMINA FOR IMPROVED THREE WAY CATALYSTS

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalytic conversion catalysts, are widely utilized to reduce the amount of these pollutants emitted to atmosphere. A commonly used catalyst for gasoline engine exhaust treatments is the TWC (three way catalyst). TWCs perform three main functions: (1) oxidation of CO; (2) oxidation of unburnt HCs; and (3) reduction of $NO_x$.

Despite advances in TWC technology, there remains a need for improved catalytic converters for certain engine platforms that simultaneously improve the performance in cold start stage, give better light off performance, as well as at hot transient stage, give better OSC performance, with wide range of Pt, Pd, and/or Rh applications. This invention solves these problems amongst others.

SUMMARY OF THE INVENTION

One aspect of the present disclosure is directed to a catalytic article treating exhaust gas comprising: a substrate comprising an inlet end and an outlet end with an axial length L; and a first catalytic region on the substrate; wherein the first catalytic region comprises a first PGM component and a first alumina, wherein the first alumina is doped with a first dopant of at least 5 wt. %, and wherein the first dopant is selected from the group consisting of Zr, Ta, Mo, W, Ti, Nb, and a combination thereof.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

DETAILED DESCRIPTION OF THE INVENTION

Figure 1:
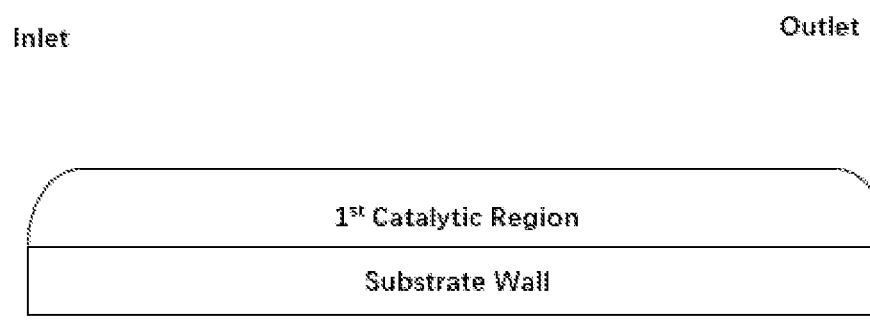
FIG. 1 shows one embodiment according to the present invention, which contains first catalytic region with a length of 100% to the axial length L of the substrate (single layer).

The present invention is directed to the catalytic treatment of combustion exhaust gas, such as that produced by gasoline and other engines, and to related catalysts compositions, catalytic articles, and systems. More specifically, the invention relates the simultaneous treatment of $NO_x$, CO, and HC in a vehicular exhaust system. Although, most of technology development to improve TWC performance have been focused on increasing thermal stability of support alumina materials by doping of lanthanum or other rare earth elements, the inventors have surprisingly discovered that modification of the alumina materials by transition metals like titanium and niobium provides further impact on the improved light off performance of TWC and resulting emission control performance. The inventors have discovered that TWC potential performance under light off tests as well as substantial performance under emission control tests were improved with this invention. The processes of the present invention also significantly reduce the loading of PGM in TWC to save precious natural resource as well as to reduce the costs of the catalyst products.

One aspect of the present disclosure is directed to a catalytic article for treating exhaust gas comprising: a substrate comprising an inlet end and an outlet end with an axial length L; and a first catalytic region on the substrate; wherein the first catalytic region comprises a first PGM component and a first alumina, wherein the first alumina is doped with a first dopant of at least 5 wt. %, and wherein the first dopant is selected from the group consisting of Zr, Ta, Mo, W, Ti, Nb, and a combination thereof.

Through intensive research, the inventors have found that by doping of the first dopant, such as Ti and Nb into the TWC catalyst compositions, these novel compositions have demonstrated excellent catalytic properties (e.g., all the emissions, THC/NMHC, CO and $NO_x$ emission could get significant reduced during vehicle testing by using the Ti or Nb containing catalyst as described in this invention).

Throughout the application, "wt. %" in connection with the dopant is calculated based on metal oxide.

First Catalytic Region

The first PGM component can be selected from the group consisting of platinum, palladium, rhodium, and a combination thereof. In some embodiments, the first PGM component can be Pd, Rh or a mixture thereof. In other embodiments, the first PGM component can be rhodium. In further embodiments, the first catalytic region is substantially free of PGMs other than Rh. In yet other embodiments, the first PGM component can be platinum and rhodium; palladium and rhodium; or platinum, palladium, and rhodium. In further embodiments, the first PGM component can be platinum and rhodium; or platinum, palladium, and rhodium The first alumina can be alumina, lanthania/alumina, or a silica/alumina composite oxide. In some embodiments, the first alumina is lanthania-alumina (e.g., lanthanum stabilized alumina), wherein lanthania is up to 10 wt. %, preferably, 2-8, 3-7, or 4-6 wt. % of the first alumina. In certain embodiments, the first alumina can be gamma alumina. In other embodiments, the first alumina can be theta alumina.

In some embodiments, the first dopant can be selected from the group consisting of Zr, Ta, Ti, Nb, and a combination thereof. In further embodiments, the first dopant can be Ti, Nb, or a combination thereof. In yet another further embodiment, the first dopant can be Ti or Nb. In certain embodiments, the first dopant can be Ti. In other embodiments, the first dopant can be Nb. In certain embodiments, the first dopant content in the first alumina can be 5 wt. %-90 wt. %. In some further embodiments, the first dopant content in the first alumina can be 5 wt. %-20 wt. %.

In other further embodiments, the first dopant content in the first alumina can be 20 wt. %-80 wt. %. In yet other further embodiments, the first dopant content in the first alumina can be 30 wt. %-70 wt. % or 40 wt. %-60 wt. %. In certain embodiments, the specific surface area (SSA) of the doped first alumina can be 80-180 m$^2$/g, 100-165 m$^2$/g, or 130-150 m$^2$/g, measured by the Brunauer-Emmett-Teller (BET) method. In some embodiments, the doped first alumina can have a crystallite size of 5-30 nm, 10-25 nm or 15-20 nm. After hydrothermal aged for 4 hours at 1000° C. under air with 10% steam, in certain embodiments, the SSA of the aged doped first alumina can be 1-60 m$^2$/g, 2-30 m$^2$/g, or 4-10 m$^2$/g, measured by BET. In some embodiments, the aged doped first dalumina can have a crystallite size of 50-300 nm, 80-200 nm or 100-150 nm. When the first dopant is Ti, the crystal phase of $TiO_2$ in fresh Ti doped alumina can be anatase; and the crystal phase of $TiO_2$ in aged Ti doped alumina can be rutile.

The first catalytic region may further comprise a first oxygen storage capacity (OSC) material, and/or a first alkali or alkali earth metal component.

The first OSC material can be cerium oxide, zirconium oxide, a ceria-zirconia mixed oxide, an alumina-ceria-zirconia mixed oxide, or a combination thereof. More preferably, the first OSC material comprises the ceria-zirconia mixed oxide, the alumina-ceria-zirconia mixed oxide or a combination thereof. The ceria-zirconia mixed oxide can further comprise dopants, such as lanthanum, neodymium, praseodymium, yttrium oxides, etc. The first OSC material may function as a support material for the first PGM component (e.g., as the first PGM support material). In some embodiments, the first OSC material comprises the ceria-zirconia mixed oxide and the alumina-ceria-zirconia mixed oxide.

The first catalytic region may further comprise a first alkali or alkaline earth metal.

The first alkali or alkaline earth metal is preferably barium, or strontium, and mixed oxides or composite oxides thereof. Preferably the barium or strontium, where present, is loaded in an amount of 0.1 to 15 wt. %, and more preferably 3 to 10 wt. % of barium or strontium, based on the total weight of the first catalytic region.

Preferably the barium or the strontium is present as $BaCO_3$ or $SrCO_3$. Such a material can be performed by any method known in the art, for example incipient wetness impregnation or spray-drying.

In some embodiments, the first PGM component can be supported on the first alumina.

The first dopant, such as titanium (Ti) or niobium (Nb) can be incorporated into the first catalytic region in various ways. In some embodiments, Ti can be incorporated into the first alumina material as dopant and the first alumina material can comprise up to 80 wt. % Ti; preferably, up to 60 wt. % Ti, based on the total weight of the first alumina material. Alternatively, the first alumina material can comprise 5 to 80 wt. % Ti; preferably, 10 to 70 wt. % Ti; more preferably, 20 to 65 wt. % Ti; even more preferably, 40 to 60 wt. % Ti, based on the total weight of the first alumina material.

In other embodiments, Nb can be incorporated into the first alumina material as dopant and the first alumina material can comprise up to 80 wt. % Nb; preferably, up to 50 wt. % Nb, more preferably, up to 25 wt. % Nb, based on the total weight of the first alumina material. Alternatively, the first alumina material can comprise 5 to 80 wt. % Nb; preferably, 10 to 50 wt. % Nb; more preferably, 10 to 30 wt. % Nb; even more preferably, 15 to 25 wt. % Nb, based on the total weight of the first alumina material.

As demonstrated in the Examples below, the catalyst article in this aspect can be applied as a TWC catalyst for treating exhaust gas produced by gasoline engines.

Figure 2:
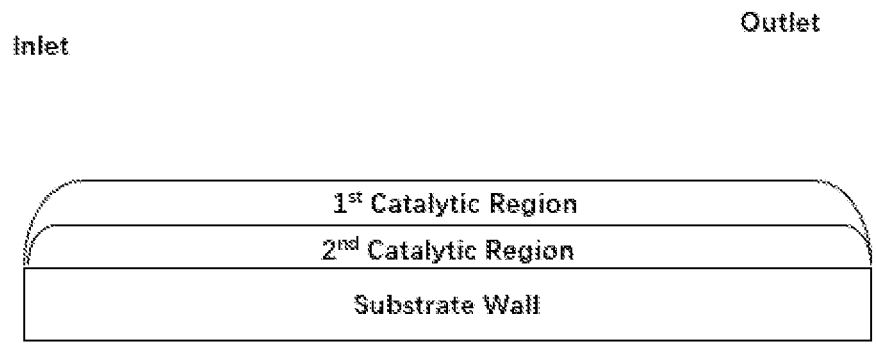
FIG. 2 shows one embodiment according to the present invention, the first catalytic region extends 100% of the axial length L, as bottom layer; the second catalytic region extends 100% of the axial length L, as top layer.

The first catalytic region can extend for 100 percent of the axial length L. (E.g., see FIGS. 1 and 2).

The total washcoat loading of the first catalytic region can be less than 3.5 g/in$^3$; preferably, less than 3.0 g/in$^3$ or 2.5 g/in$^3$. Alternatively, the total washcoat loading of the first catalytic region can be from 0.5 to 3.5 g/in$^3$; preferably, can be from 0.6 to 3 g/in$^3$ or 0.7 to 2.5 g/in$^3$.

Second Catalytic Region

The catalytic article may further comprise a second catalytic region.

The second catalytic region can further comprise a second PGM component, a second oxygen storage capacity (OSC) material, a second alkali or alkaline earth metal component, and/or a second inorganic oxide.

The second PGM component can be selected from the group consisting of platinum, palladium, rhodium, and a mixture thereof. In some embodiments, the second PGM component can be Pd, Pt or a mixture thereof.

The second OSC material can be cerium oxide, zirconium oxide, a ceria-zirconia mixed oxide, an alumina-ceria-zirconia mixed oxide, or a combination thereof. More preferably, the second OSC material comprises the ceria-zirconia mixed oxide, the alumina-ceria-zirconia mixed oxide, or a combination thereof. In addition, the second OSC material may further comprise one or more of dopants like lanthanum, neodymium, praseodymium, yttrium etc. Moreover, the second OSC material may have the function as a support material for the second PGM component. In some embodiments, the second OSC material comprises the ceria-zirconia mixed oxide and the alumina-ceria-zirconia mixed oxide.

The ceria-zirconia mixed oxide can have a weight ratio of zirconia to ceria at least 50:50; preferably, higher than 60:40; more preferably, higher than 70:30. Alternatively, the ceria-zirconia mixed oxide also can have a weight ratio of ceria to zirconia less than 50:50, preferably, less than 40:60, more preferably, less than 30:70.

The second OSC material (e.g., ceria-zirconia mixed oxide) can be from 10 to 90 wt. %; preferably, 25-75 wt. %; more preferably, 30-60 wt. %, based on the total washcoat loading of the second catalytic region.

The second OSC material loading in the second catalytic region can be less than 2 g/in$^3$. In some embodiments, the second OSC material loading in the second catalytic region is no greater than 1.5 g/in$^3$, 1.2 g/in$^3$, 1 g/in$^3$, 0.8 g/in$^3$, or 0.7 g/in$^3$.

The second alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the second catalytic region.

It is even more preferable that the second alkali or alkaline earth metal is strontium. The strontium, where present, is preferably present in an amount of 0.1 to 15 wt. %, and more preferably 3 to 10 wt. %, based on the total weight of the second catalytic region.

It is also preferable that the second alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the second catalytic region. It is more preferable that the second alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The second inorganic oxide is preferably an oxide of Groups 2, 3, 4, 5, 13 and 14 elements. The second inorganic oxide is preferably selected from the group consisting of alumina, magnesia, silica, zirconia, barium oxides, and mixed oxides or composite oxides thereof. Particularly preferably, the second inorganic oxide is alumina, lanthania-alumina, zirconia, or a silica/alumina composite oxide. More preferably, the second inorganic oxide is alumina, lanthania-alumina, or a silica/alumina composite oxide. One especially preferred second inorganic oxide is alumina or lanthania-alumina. In some embodiments, the second inorganic oxide is lanthania-alumina (e.g., lanthanum stabilized alumina), wherein lanthania is up to 10 wt. %, preferably, 2-8, 3-7, or 4-6 wt. % of the second inorganic oxide.

In some embodiments, the second inorganic oxide is doped with a second dopant of at least 5 wt. %, and wherein the second dopant is selected from the group consisting of Zr, Ta, Mo, W, Ti, Nb, and a combination thereof. In further embodiments, the second dopant can be selected from the group consisting of Zr, Ta, Ti, Nb, and a combination thereof. In yet further embodiments, the second dopant can be Ti, Nb, or a combination thereof. In yet another further embodiment, the second dopant can be Ti or Nb. In certain embodiments, the second dopant can be Ti. In other embodiments, the second dopant can be Nb. In certain embodiments, the second dopant content in the second inorganic oxide (such as alumina) can be 5 wt. %-90 wt. %. In some further embodiments, the second dopant content in the second inorganic oxide can be 5 wt. %-20 wt. %. In other further embodiments, the second dopant content in the second inorganic oxide can be 20 wt. %-80 wt. %.

The total washcoat loading of the second catalytic region can be less than 3.5 $g/in^3$; preferably, less than 3.0 $g/in^3$ or 2.5 $g/in^3$. Alternatively, the total washcoat loading of the first catalytic region can be from 0.5 to 3.5 $g/in^3$; preferably, can be from 0.6 to 3 $g/in^3$ or 0.7 to 2.5 $g/in^3$.

The second catalytic region can extend for 100 percent of the axial length L. (E.g., see FIG. 2)

In some embodiments, the first catalytic region can be supported/deposited directly on the substrate. In certain embodiments, the second catalytic region can be supported/deposited directly on the substrate.

The catalyst article of the invention may comprise further components that are known to the skilled person. For example, the compositions of the invention may further comprise at least one binder and/or at least one surfactant. Where a binder is present, dispersible alumina binders are preferred.

Substrate

Preferably the substrate is a flow-through monolith. Alternatively, the substrate can be a wall-flow filter.

The flow-through monolith substrate has a first face and a second face defining a longitudinal direction therebetween. The flow-through monolith substrate has a plurality of channels extending between the first face and the second face. The plurality of channels extends in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

Another aspect of the present disclosure is directed to a method for treating a vehicular exhaust gas containing $NO_x$, CO, and HC using the catalyst article described herein. Catalytic converters equipped with the TWC made according to this method show improved catalytic properties compared to conventional TWC (with the same or lower PGM loading), also show especially better light off performance and emission control performance of THC, CO, and $NO_x$ (e.g., see Examples 1-4 and Tables 1-5).

Another aspect of the present disclosure is directed to a system for treating vehicular exhaust gas comprising the catalyst article described herein in conjunction with a conduit for transferring the exhaust gas through the system.

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g., region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:
 (a) nearer to an inlet end (e.g. open end) of an inlet channel of the substrate than the zone is to a closed end (e.g. blocked or plugged end) of the inlet channel, and/or
 (b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:
 (a) nearer to an outlet end (e.g. an open end) of an outlet channel of the substrate than the zone is to a closed end (e.g. blocked or plugged) of the outlet channel, and/or
 (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The following examples merely illustrate the invention. Those skilled in the art will recognize many variations that are within the spirit of the invention and scope of the claims.

EXAMPLES

Materials

All materials are commercially available and were obtained from known suppliers, unless noted otherwise.

General Procedure for the Doped Inorganic Oxide Synthesis

A commercially available La-stabilized γ-$Al_2O_3$ with surface area of about 180 $m^2/g$ and Nd-stabilized zirconia with surface area of about 60 m²/g was used as $Al_2O_3$ and $ZrO_2$ support materials, respectively. The addition of the dopant, such as Nb or Ti to the supports was performed as follows.

Dopant as Nb: An aqueous solution containing ammonium niobate (V) oxalate hydrate was impregnated into the $Al_2O_3$ or $ZrO_2$ support material with the target loading of Nb. This was followed by drying at 150° C. for 3 h and calcination in air at 500° C. for 2 h to yield the Nb-doped support materials.

Dopant as Ti: Titanium isopropoxide liquid was added into a slurry of the $Al_2O_3$ support material with the target loading of Ti. This was followed by filtration, drying at 150° C. for 3 h and calcination in air at 500° C. for 2 h to yield the Ti-doped $Al_2O_3$ materials.

Example 1: Light Off Performances in Synthetic Catalyst Activity Test for Nb-Doped Support Materials Comparative Catalyst A Comparative Catalyst A is a single-layered TWC coated on a ceramic substrate (400 cpsi, 4.0 mil wall thickness). The catalyst layer consists of Rh supported on a washcoat of La-stabilized alumina and Nd-stabilized zirconia where Rh was prefixed on the alumina support. The washcoat loading was about 2.0 g/in³ with a Rh loading of 15 g/ft³.

Comparative Catalyst B

Comparative Catalyst B is a single-layered TWC coated on a ceramic substrate (400 cpsi, 4.0 mil wall thickness). The catalyst layer consists of Rh supported on a washcoat of La-stabilized alumina and Nd-stabilized zirconia where Rh was prefixed on the zirconia support. The washcoat loading was about 2.0 g/in³ with a Rh loading of 15 g/ft³.

Comparative Catalyst C

Comparative Catalyst C is a single-layered TWC coated on a ceramic substrate (400 cpsi, 4.0 mil wall thickness). The catalyst layer consists of Rh supported on a washcoat of La-stabilized alumina and 5-wt % Nb-doped zirconia where Rh was prefixed on the zirconia support. The washcoat loading was about 2.0 g/in³ with a Rh loading of 15 g/ft³.

Comparative Catalyst D

Comparative Catalyst D is a single-layered TWC coated on a ceramic substrate (400 cpsi, 4.0 mil wall thickness). The catalyst layer consists of Rh supported on a washcoat of La-stabilized alumina and 20-wt % Nb-doped zirconia where Rh was prefixed on the zirconia support. The washcoat loading was about 2.0 g/in³ with a Rh loading of 15 g/ft³.

Catalyst E

Catalyst E is a single-layered TWC coated on a ceramic substrate (400 cpsi, 4.0 mil wall thickness). The catalyst layer consists of Rh supported on a washcoat of 5-wt % Nb-doped alumina and Nd-doped zirconia where Rh was prefixed on the alumina support. The washcoat loading was about 2.0 g/in³ with a Rh loading of 15 g/ft³.

Catalyst F

Catalyst F is a single-layered TWC coated on a ceramic substrate (400 cpsi, 4.0 mil wall thickness). The catalyst layer consists of Rh supported on a washcoat of 20-wt % Nb-doped alumina and Nd-doped zirconia where Rh was prefixed on the alumina support. The washcoat loading was about 2.0 g/in³ with a Rh loading of 15 g/ft³.

Comparative Catalysts A-D, and Catalysts E and F were tested separately over a Synthetic Catalyst Activity Test (SCAT) device. The light off performance was tested in a gas flow of 10 vol. % $H_2O$+15 vol. % $CO_2$+1260 ppmC $C_3H_6$+ 0.2 vol. % $H_2$+0.6 vol. % CO+0.53 vol. % $O_2$+1000 ppm NO balanced with $N_2$ (the space velocity was 60000 $h^{-1}$), and temperature ramp is 30° C./min. The conversion of THC, CO and $NO_x$ were calculated from comparing the concentration of the feed gas and the gas at the outlets of the catalysts. A series of Comparative Catalysts A-D, and Catalysts E and F were hydrothermal aged for 4 hours at 1000° C. under air with 10% steam.

The HC, CO and $NO_x$ $T_{50}$ light off temperatures of the aged Comparative Catalysts A-D, and Catalysts E and F are shown in Table 1. The data indicate that, surprisingly, Nb-doped alumina containing Catalysts E and F of the present invention gave significantly improved light-off performance when compared with Comparative Catalysts A and B (Nb-free alumina and zirconia), and Comparative Catalysts C and D (Nb-doped zirconia). The impact of the light off performance improvement was about 20° C., 45° C. and 35° C. lower $T_{50}$ ($T_{50}$ is the temperature when the conversion reaching 50%) for CO, HC and $NO_x$, respectively, for Catalyst E of 5-wt % Nb-doped alumina as compared to Comparative Catalyst C of 5-wt % Nb-doped zirconia. The impact was also apparated for Catalyst F of 20-wt % Nb-doped alumina as respect to Comparative Catalyst D of 20-wt % Nb-doped zirconia with about 19° C., 30° C. and 20° C. lower $T_{50}$ for CO, HC and $NO_x$, respectively. While the Nb-doping can improve both zirconia and alumina supports of Rh, the impact is much more significant for the alumina support.

TABLE 1

SCAT Light Off Test Results

| | $T_{50}$ (° C.) | | |
|---|---|---|---|
| | CO | HC | $NO_x$ |
| Comparative Catalyst A | 324 | 386 | 360 |
| Comparative Catalyst B | 318 | 383 | 365 |
| Comparative Catalyst C | 321 | 375 | 360 |
| Comparative Catalyst D | 313 | 339 | 324 |
| Catalyst E | 301 | 330 | 325 |
| Catalyst F | 294 | 309 | 304 |

Example 2: Light Off Performances in Synthetic Catalyst Activity Test for Ti and Nb-Doped Alumina Comparative Catalyst G Comparative Catalyst G is a single-layered TWC coated on a ceramic substrate (400 cpsi, 4.0 mil wall thickness). The catalyst layer consists of Rh supported on a washcoat of La-stabilized alumina and CeZr mixed oxide where Rh was prefixed on the alumina support. The washcoat loading was about 2.0 g/in³ with a Rh loading of 8.6 g/ft³.

Catalyst H

Catalyst H is a single-layered TWC coated on a ceramic substrate (400 cpsi, 4.0 mil wall thickness). The catalyst layer consists of Rh supported on a washcoat of 5% Nb-doped La-stabilized alumina and CeZr mixed oxide where Rh was prefixed on the alumina support. The washcoat loading was about 2.0 g/in$^3$ with a Rh loading of 8.6 g/ft$^3$.

Catalyst I

Catalyst I is a single-layered TWC coated on a ceramic substrate (400 cpsi, 4.0 mil wall thickness). The catalyst layer consists of Rh supported on a washcoat of 5% Ti-doped La-stabilized alumina and CeZr mixed oxide where Rh was prefixed on the alumina support. The washcoat loading was about 2.0 g/in$^3$ with a Rh loading of 8.6 g/ft$^3$.

Catalyst J

Catalyst J is a single-layered TWC coated on a ceramic substrate (400 cpsi, 4.0 mil wall thickness). The catalyst layer consists of Rh supported on a washcoat of 5% Ti-doped La-free gamma phase alumina and CeZr mixed oxide where Rh was prefixed on the alumina support. The washcoat loading was about 1.6 g/in$^3$ with a Rh loading of 8.6 g/ft$^3$.

Catalyst K

Catalyst K is a single-layered TWC coated on a ceramic substrate (400 cpsi, 4.0 mil wall thickness). The catalyst layer consists of Rh supported on a washcoat of 5% Ti-doped La-stabilized theta phase alumina and CeZr mixed oxide where Rh was prefixed on the alumina support. The washcoat loading was about 1.6 g/in$^3$ with a Rh loading of 8.6 g/ft$^3$.

Comparative Catalyst G, and Catalysts H and I were tested separately over a Synthetic Catalyst Activity Test (SCAT) device after hydrothermal aged for 4 hours at 1000° C. under air with 10% steam.

The HC, CO and NO$_x$ T$_{50}$ light off temperatures of the aged Comparative Catalyst G, and Catalyst H and I are shown in Table 2. The data indicate that, surprisingly, Nb-doped alumina containing Catalysts E and F of the present invention gave significantly improved light-off performance when compared with Comparative Catalyst G. Catalyst I with Ti-doped alumina further improve the light off performance as respect to Catalyst H (Nb-doped alumina containing TWC).

TABLE 2

| SCAT Light Off Test Results | | | |
|---|---|---|---|
| | T$_{50}$ (° C.) | | |
| | CO | HC | NO$_x$ |
| Comparative Catalyst G | 348 | 462 | 455 |
| Catalyst H | 351 | 385 | 373 |
| Catalyst I | 310 | 357 | 326 |

Catalysts I, J, and K were tested separately over a Synthetic Catalyst Activity Test (SCAT) device after hydrothermal aged for 4 hours at 1050° C. under air with 10% steam.

The HC, CO and NO$_x$ T$_{50}$ light off temperatures of the aged Catalyst I, J and K are shown in Table 3. The data indicate that, surprisingly, Ti-doping to La-stabilized alumina of Catalyst K of theta phase gave significantly improved light-off performance when compared with Catalyst I of Ti doped to La-stabilized gamma-phase alumina and Catalyst J of Ti doped La-free gamma alumina. Theta phase of alumina can further improve the Rh catalyst performance with Ti-doped alumina support.

TABLE 3

| SCAT Light Off Test Results | | | |
|---|---|---|---|
| | T$_{50}$ (° C.) | | |
| | CO | HC | NO$_x$ |
| Catalyst I | 313 | 385 | 335 |
| Catalyst J | 319 | 375 | 337 |
| Catalyst K | 304 | 371 | 326 |

Example 3: Light Off Performances in Synthetic Catalyst Activity Test for Ti-Doped Alumina with Various Ti Contents Comparative Catalyst L Comparative Catalyst L is a single-layered TWC coated on a ceramic substrate (400 cpsi, 4.0 mil wall thickness). The catalyst layer consists of Rh supported on a washcoat of La-stabilized alumina and CeZr mixed oxide where Rh was prefixed on the alumina support. The washcoat loading was about 1.6 g/in$^3$ with a Rh loading of 2.0 g/ft$^3$.

Catalyst M

Catalyst M is a single-layered TWC coated on a ceramic substrate (400 cpsi, 4.0 mil wall thickness). The catalyst layer consists of Rh supported on a washcoat of 5-wt % Ti-doped La-stabilized alumina and CeZr mixed oxide where Rh was prefixed on the alumina support. The washcoat loading was about 1.6 g/in$^3$ with a Rh loading of 2.0 g/ft$^3$.

Catalyst N

Catalyst N is a single-layered TWC coated on a ceramic substrate (400 cpsi, 4.0 mil wall thickness). The catalyst layer consists of Rh supported on a washcoat of 10-wt % Ti-doped La-stabilized alumina and CeZr mixed oxide where Rh was prefixed on the alumina support. The washcoat loading was about 1.6 g/in$^3$ with a Rh loading of 2.0 g/ft$^3$.

Catalyst O

Catalyst O is a single-layered TWC coated on a ceramic substrate (400 cpsi, 4.0 mil wall thickness). The catalyst layer consists of Rh supported on a washcoat of 20-wt % Ti-doped La-stabilized alumina and CeZr mixed oxide where Rh was prefixed on the alumina support. The washcoat loading was about 1.6 g/in$^3$ with a Rh loading of 2.0 g/ft$^3$.

Catalyst P

Catalyst P is a single-layered TWC coated on a ceramic substrate (400 cpsi, 4.0 mil wall thickness). The catalyst layer consists of Rh supported on a washcoat of 50-wt % Ti-doped La-stabilized alumina and CeZr mixed oxide where Rh was prefixed on the alumina support. The washcoat loading was about 1.6 g/in$^3$ with a Rh loading of 2.0 g/ft$^3$.

Catalyst Q

Catalyst Q is a single-layered TWC coated on a ceramic substrate (400 cpsi, 4.0 mil wall thickness). The catalyst layer consists of Rh supported on a washcoat of 80-wt % Ti-doped La-stabilized alumina and CeZr mixed oxide where Rh was prefixed on the alumina support. The washcoat loading was about 1.6 g/in$^3$ with a Rh loading of 2.0 g/ft$^3$.

Comparative Catalysts G and L, and Catalysts M-Q were tested separately over a Synthetic Catalyst Activity Test (SCAT) device after hydrothermal aged for 4 hours at 1000° C. under air with 10% steam.

The HC, CO and NO$_x$ T$_{50}$ light off temperatures of the aged Comparative Catalysts G and L, and Catalysts M-Q are shown in Table 4. The data indicate that, surprisingly, all Ti-doped alumina TWC of Catalysts M-Q of the present invention gave significantly improved light-off performance when compared with Comparative Catalyst L (Ti-free alumina with same Rh loading of 2.0 g/ft$^3$). When compared to Comparative Catalyst G of higher Rh loading of 8.6 g/ft$^3$, furthermore, Catalyst P of 50-wt % Ti doped alumina TWC with 2.0-g/ft$^3$ Rh loading showed significant improvement of light off performance with about 32° C., 79° C. and 107° C. lower T$_{50}$ for CO, HC and NO$_x$, respectively. Therefore, utilization of high-Ti containing alumina support can drastically reduce Rh loading of more than 75% with improving the light off performance of TWC. This invention can save precious natural resource of Rh used in automotive industry as well as can provide cleaner-air environment through significant performance improvement of TWC to reduce air-pollutions by automobiles.

TABLE 4

SCAT Light Off Test Results

| | Rh Loading (g/ft$^3$) | T$_{50}$ (° C.) CO | HC | NO$_x$ |
|---|---|---|---|---|
| Comparative Catalyst G | 8.6 | 338 | 435 | 427 |
| Comparative Catalyst L | 2.0 | 431 | 556 | 593 |
| Catalyst M | 2.0 | 375 | 421 | 385 |
| Catalyst N | 2.0 | 347 | 395 | 359 |
| Catalyst O | 2.0 | 328 | 377 | 341 |
| Catalyst P | 2.0 | 306 | 356 | 320 |
| Catalyst Q | 2.0 | 322 | 372 | 338 |

Example 4: Emission Control Performance in Gasoline Passenger Vehicle

Comparative Catalyst R

Comparative Catalyst R is a double-layered TWC comprising a first catalyst region in top layer and a second catalyst region in bottom layer (e.g., see FIG. 2), coated on a ceramic substrate (600 cpsi, 4.3 mil wall thickness).
First Catalytic Region:
The first catalytic region consists of Rh supported on a washcoat of CeZr mixed oxide, and La-stabilized alumina. The washcoat loading of the second catalytic region was about 2.0 g/in$^3$ with a Rh loading of 15 g/ft$^3$.
Second Catalytic Region:
The second catalytic region consists of Pd supported on a washcoat of CeZr mixed oxide, La-stabilized alumina, and Ba promotor. The washcoat loading of the first catalytic region was about 2.0 g/in$^3$ with a Pd loading of 100 g/ft$^3$.

Catalyst S

Catalyst S is a double-layered TWC comprising a first catalyst region in top layer and a second catalyst region in bottom layer (e.g., see FIG. 2), coated on a ceramic substrate (600 cpsi, 4.3 mil wall thickness).
First Catalytic Region:
The first catalytic region consists of Rh supported on a washcoat of CeZr mixed oxide, and 5% Nb-stabilized alumina. The washcoat loading of the second catalytic region was about 2.0 g/in$^3$ with a Rh loading of 15 g/ft$^3$.
Second Catalytic Region:
The second catalytic region consists of Pd supported on a washcoat of CeZr mixed oxide, La-stabilized alumina, and Ba promotor. The washcoat loading of the first catalytic region was about 2.0 g/in$^3$ with a Pd loading of 100 g/ft$^3$.

Comparative Catalyst R and Catalyst S were bench aged for 100 hours with fuel cut aging cycles, with peak temperature at 1000° C. Vehicle emissions were conducted over a commercial vehicle with 2.5 litre engine. Emissions were measured pre- and post-catalyst.

TABLE 5

Catalysts Performance by Bag Emission Analysis

| | Tailpipe Emissions (g) | | |
|---|---|---|---|
| | HC | CO/10 | NO$_x$ |
| Comparative Catalyst R | 2.33 | 2.28 | 5.01 |
| Catalyst S | 1.50 | 1.44 | 2.48 |

As shown in Table 5, Catalyst S showed significant reduction of emission of HC, CO, and NO$_x$ in comparison with Comparative Catalyst R (36%, 37%, and 51% reduction respectively).

Example 5: Effective Range of SSA and Crystalize Size

Catalyst T

Catalyst T is a single-layered TWC coated on a ceramic substrate (400 cpsi, 4.0 mil wall thickness). The catalyst layer consists of Rh supported on a washcoat of 50-wt % Ti-doped La-stabilized alumina and CeZr mixed oxide where Rh was prefixed on the alumina support. The washcoat loading was about 1.6 g/in$^3$ with a Rh loading of 2.0 g/ft$^3$. The specific surface area (SSA) of 50-wt % Ti-doped La-stabilized alumina is 205 m$^2$/g, with anatase crystallite size of 7 nm after drying at 150° C. for 3 h and calcination in air at 500° C. for 2 h. The SSA of 50-wt % Ti-doped La-stabilized alumina is 18 m$^2$/g with the rutile crystallite size of 91 nm after hydrothermal aged for 4 hours at 1000° C. under air with 10% steam.

Catalyst U

Catalyst U is a single-layered TWC coated on a ceramic substrate (400 cpsi, 4.0 mil wall thickness). The catalyst layer consists of Rh supported on a washcoat of 50-wt % Ti-doped La-stabilized alumina and CeZr mixed oxide where Rh was prefixed on the alumina support. The washcoat loading was about 1.6 g/in$^3$ with a Rh loading of 2.0 g/ft$^3$. The SSA of 50-wt % Ti-doped La-stabilized alumina is 200 m$^2$/g, with anatase crystallite size of 9 nm after drying at 150° C. for 3 h and calcination in air at 500° C. for 2 h.

The SSA of 50-wt % Ti-doped La-stabilized alumina is 13 m$^2$/g, with the rutile crystallite size of 117 nm after hydrothermal aged for 4 hours at 1000° C. under air with 10% steam.

Catalyst V

Catalyst V is a single-layered TWC coated on a ceramic substrate (400 cpsi, 4.0 mil wall thickness). The catalyst layer consists of Rh supported on a washcoat of 50-wt % Ti-doped La-stabilized alumina and CeZr mixed oxide where Rh was prefixed on the alumina support. The washcoat loading was about 1.6 g/in$^3$ with a Rh loading of 2.0 g/ft$^3$. The SSA of 50-wt % Ti-doped La-stabilized alumina is 168 m$^2$/g, with anatase crystallite size of 12 nm after drying at 150° C. for 3 h and calcination in air at 500° C. for 2 h. The SSA of 50-wt % Ti-doped La-stabilized alumina is 15 m$^2$/g with the rutile crystallite size of around 132 nm after hydrothermal aged for 4 hours at 1000° C. under air with 10% steam.

Catalyst W

Catalyst W is a single-layered TWC coated on a ceramic substrate (400 cpsi, 4.0 mil wall thickness). The catalyst layer consists of Rh supported on a washcoat of 50-wt % Ti-doped La-stabilized alumina and CeZr mixed oxide where Rh was prefixed on the alumina support. The washcoat loading was about 1.6 g/in$^3$ with a Rh loading of 2.0 g/ft$^3$. The SSA of 50-wt % Ti-doped La-stabilized alumina is 152 m$^2$/g, with anatase crystallite size of 14 nm after drying at 150° C. for 3 h and calcination in air at 500° C. for 2 h. The SSA of 50-wt % Ti-doped La-stabilized alumina is 10 m$^2$/g with the rutile crystallite size of 152 nm after hydrothermal aged for 4 hours at 1000° C. under air with 10% steam.

Catalyst X

Catalyst X is a single-layered TWC coated on a ceramic substrate (400 cpsi, 4.0 mil wall thickness). The catalyst layer consists of Rh supported on a washcoat of 50-wt % Ti-doped La-stabilized alumina and CeZr mixed oxide where Rh was prefixed on the alumina support. The washcoat loading was about 1.6 g/in$^3$ with a Rh loading of 2.0 g/ft$^3$. The SSA of 50-wt % Ti-doped La-stabilized alumina is 137 m$^2$/g, with anatase crystallite size of 19 nm after drying at 150° C. for 3 h and calcination in air at 500° C. for 2 h. The SSA of 50-wt % Ti-doped La-stabilized alumina is 7 m$^2$/g with the rutile crystallite size of 121 nm after hydrothermal aged for 4 hours at 1000° C. under air with 10% steam.

Catalysts T-X were tested separately over a Synthetic Catalyst Activity Test (SCAT) device after hydrothermal aged for 4 hours at 1000° C. under air with 10% steam.

The HC, CO and NO$_x$ T$_{50}$ light off temperatures of the aged Catalysts T-X are shown in Table 6. The data indicate that, surprisingly, 50-wt % Ti-doping to La-stabilized alumina of Catalyst X of the surface area of 137 m$^2$/g with anatase crystallite size of 19 nm in the fresh gave significantly improved light-off performance when compared with Catalysts T-W of the larger surface area of 152-205 m$^2$/g and the smaller crystallite size of 7~14 nm. The physical characteristics like SSA and crystallite size of titania phase of Ti-doped alumina highly influences the catalytic performance of TWC.

TABLE 6

SCAT Light Off Test Results and characterisation results

|  | T$_{50}$ (° C.) | | | Fresh | | Aged | |
| --- | --- | --- | --- | --- | --- | --- | --- |
|  | CO | HC | NO$_x$ | SSA (m$^2$/g) | Crystallite size (nm) (Anatase) | SSA (m$^2$/g) | Crystallite size (nm) (rutile) |
| Catalyst T | 299 | 338 | 310 | 205 | 7 | 18 | 91 |
| Catalyst U | 285 | 328 | 299 | 199 | 9 | 13 | 117 |
| Catalyst V | 281 | 326 | 289 | 168 | 12 | 15 | 132 |
| Catalyst W | 278 | 321 | 288 | 152 | 14 | 10 | 152 |
| Catalyst X | 269 | 307 | 282 | 137 | 19 | 7 | 121 |

We claim:

1. A catalyst article for treating exhaust gas comprising:
   a substrate comprising an inlet end and an outlet end with an axial length L; and
   a first catalytic region on the substrate;
   wherein the first catalytic region comprises a first PGM component and a first alumina,
   wherein the first alumina is doped with a first dopant of at least 5 wt. %, and
   wherein the first dopant is selected from the group consisting of Ta, Mo, W, and a combination thereof.

2. The catalyst article of claim 1, wherein the first dopant content in the first alumina is 5 wt. %-90 wt. %.

3. The catalyst article of claim 1, wherein the first dopant content in the first alumina is 5 wt. %-20 wt. %.

4. The catalyst article of claim 1, wherein the first dopant content in the first alumina is 20 wt. %-80 wt. %.

5. The catalyst article of claim 1, wherein the first alumina is further stabilized with La.

6. The catalyst article of claim 1, wherein the first PGM component is Rh.

7. The catalyst article of claim 6, wherein the first catalytic region is substantially free of PGMs other than Rh.

8. The catalyst article of claim 1, further comprising a first oxygen storage capacity (OSC) material, and/or a first alkali or alkaline-earth metal component.

9. The catalyst article of claim 1, wherein the first PGM component is supported on the first alumina.

10. The catalyst article of claim 1, further comprising a second catalytic region.

11. The catalyst article of claim 10, wherein the second catalytic region comprises a second PGM component.

12. The catalyst article of claim 11, wherein the second PGM component is selected from the group consisting of Pd, Pt, Rh, and a mixture thereof.

13. The catalyst article of claim 10, wherein the second catalytic region further comprises a second oxygen storage capacity (OSC) material, a second alkali or alkaline-earth metal component, and/or a second inorganic oxide.

14. The catalyst article of claim 10, wherein the second catalytic region is supported/deposited directly on the substrate.

15. The catalyst article of claim 10, wherein the first catalytic region is supported/deposited on the second catalytic region.

16. An emission treatment system for treating a flow of a combustion exhaust gas comprising the catalyst article of claim 1.

17. A method of treating an exhaust gas from an internal combustion engine comprising contacting the exhaust gas with the catalyst article of claim 1.

* * * * *